United States Patent
Saur et al.

(10) Patent No.: US 9,149,872 B2
(45) Date of Patent: Oct. 6, 2015

(54) TOOL ATTACHMENT

(75) Inventors: Dietmar Saur, Gomaringen (DE); Michael-Andreas Grunwald, Stuttgart-Rohr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 448 days.

(21) Appl. No.: 13/609,996

(22) Filed: Sep. 11, 2012

(65) Prior Publication Data

US 2013/0093142 A1    Apr. 18, 2013

(30) Foreign Application Priority Data

Oct. 14, 2011 (DE) .......................... 10 2011 084 495

(51) Int. Cl.
| | |
|---|---|
| *B23B 31/36* | (2006.01) |
| *B23B 51/12* | (2006.01) |
| *B25F 3/00* | (2006.01) |
| *B23B 31/02* | (2006.01) |

(52) U.S. Cl.
CPC ................. *B23B 31/02* (2013.01); *B23B 31/36* (2013.01); *B23B 51/12* (2013.01); *B25F 3/00* (2013.01); *B23B 2231/04* (2013.01); *Y10T 279/17393* (2015.01); *Y10T 279/17752* (2015.01); *Y10T 279/3418* (2015.01); *Y10T 408/65* (2015.01); *Y10T 408/957* (2015.01)

(58) Field of Classification Search
CPC .... B23B 31/02; B23B 31/36; B23B 2231/04; B23B 51/12; B23F 3/00; Y10T 279/17752; Y10T 279/3418; Y10T 408/65; Y10T 408/957
USPC .......... 408/124, 239 A, 239 R; 279/143–145; 173/39, 216; 81/57.14, 57.3
See application file for complete search history.

(56) References Cited

U.S. PATENT DOCUMENTS

| | | | | |
|---|---|---|---|---|
| 1,595,064 | A * | 8/1926 | Barrett ............................ | 173/48 |
| 2,777,340 | A * | 1/1957 | Hettwer et al. ................. | 173/40 |
| 2,863,347 | A * | 12/1958 | Nelson ............................ | 81/467 |
| 3,027,789 | A * | 4/1962 | Bochman, Jr. ................. | 81/57.3 |
| 5,161,437 | A * | 11/1992 | Yasutomi et al. ............. | 81/57.14 |
| 5,511,912 | A * | 4/1996 | Ellerbrock ...................... | 408/20 |
| 5,553,519 | A * | 9/1996 | Pettit, Jr. ......................... | 81/56 |
| 5,690,005 | A * | 11/1997 | Jung et al. ...................... | 81/57.3 |
| 5,951,026 | A * | 9/1999 | Harman et al. ............... | 279/143 |
| 6,352,127 | B1 * | 3/2002 | Yorde ............................ | 173/216 |
| 6,550,786 | B2 * | 4/2003 | Gifford et al. ................. | 279/75 |
| 6,945,139 | B1 * | 9/2005 | Johnson ......................... | 81/57.3 |
| 7,331,738 | B2 * | 2/2008 | Hofbrucker et al. ...... | 408/239 A |
| 7,721,627 | B2 * | 5/2010 | Basham et al. ............. | 81/57.14 |
| 8,671,804 | B2 * | 3/2014 | Galat .............................. | 81/56 |
| 2010/0101380 | A1 * | 4/2010 | Chen ............................ | 81/437 |

* cited by examiner

Primary Examiner — Eric A Gates
(74) Attorney, Agent, or Firm — Kenyon & Kenyon LLP

(57) ABSTRACT

In a tool attachment, for fastening to an handheld machine tool equipped with a tool holding fixture, having an output shaft and a base body, which forms an inner cavity and on whose outer circumference an axially displaceable locking sleeve is situated, for releasing at least one associated locking element against a spring force of a spring element, which has a clamping ring, in the inner cavity, a anti-rotation locking unit is configured for the rotationally locked fastening of the base body to a fastening unit associated with the handheld machine tool, the anti-rotation locking unit and the fastening unit having complementary geometric forms, which are configured to engage with each other for the detachable rotationally locked fastening of the base body on the fastening unit; and the at least one associated locking element being situated in the vicinity of the anti-rotation locking unit.

11 Claims, 3 Drawing Sheets

TOOL ATTACHMENT

RELATED APPLICATION INFORMATION

The present application claims priority to and the benefit of German patent application no. 10 2011 084 495.3, which was filed in Germany on Oct. 14, 2011, the disclosure of which is incorporated herein by reference.

FIELD OF THE INVENTION

The present invention relates to a tool attachment for fastening to an handheld machine tool equipped with a tool holding fixture, having an output shaft and a base body which forms an inner cavity and at whose outer circumference an axially displaceable locking sleeve is situated for releasing at least one associated locking element against a spring force of a spring element, which has a clamping ring.

BACKGROUND INFORMATION

Such tool attachments are known from the related art, whose base bodies are able to be locked on a tool holding fixture of a corresponding handheld machine tool via an associated locking element. As locking elements, for instance, locking balls are used, which are situated radially displaceably in associated openings of the base body, and are able to be operated using a locking sleeve that is displaceable axially on the outer circumference of the base body. In this connection, the locking sleeve is acted upon, for example, by the spring force of a spring element axially into a locking position, in which the locking sleeve, or rather a clamping ring associated with it, presses radially inwards the locking balls so as to lock the base body in the associated openings. Because of an axial displacement of the locking sleeve against the spring force of the spring element, a displacement directed radially outwards of the locking balls for unlocking the base body is then able to be made possible.

The disadvantage in the related art is that such tool attachments have a comparatively large overall length. That is why these tool attachments offer only limited manipulability as well as insufficient precision.

SUMMARY OF THE INVENTION

One object of the exemplary embodiments and/or exemplary methods of the present invention is therefore to provide a new tool attachment having a reduced overall length.

The object is attained by a tool attachment for fastening to an handheld machine tool equipped with a tool holding fixture, having an output shaft and a base body which forms an inner cavity and at whose outer circumference an axially displaceable locking sleeve is situated for releasing at least one associated locking element against a spring force of a spring element, which has a clamping ring. In the inner cavity, a unit protecting against torsion is developed for the rotationally locked fastening of the base body, to a fastening unit associated with the handheld machine tool. The unit protecting against torsion and the fastening unit have complementary geometric forms, which are developed to engage with each other to form a detachable rotationally locked fastening of the base body on the fastening unit. The at least one associated locking element is situated in the vicinity of the unit of protection from torsion.

Consequently, the exemplary embodiments and/or exemplary methods of the present invention are intended to provide a tool attachment in which the reduction in the overall length is made possible, because of the situation of the locking element in the vicinity of the anti-rotation locking unit.

According to one specific embodiment, the anti-rotation locking unit and the fastening unit are provided to develop a form-locking connection.

Thus a robust and secure fastening of the tool attachment to the handheld machine tool is enabled.

The anti-rotation locking unit may have at least one groove-like recess for accommodating a crosspiece-like elevation, assigned to the fastening unit and/or at least one crosspiece-like elevation for engaging in a groove-like recess assigned to the fastening unit.

Thus a stable and reliable rotationally locked fastening of the base body to the fastening unit is enabled.

According to one specific embodiment, at least one control element is provided, which is developed to effect an axial displacement of the locking sleeve in a direction facing away from the handheld machine tool, against the spring force of the spring element, by pushing the base body onto the fastening unit of the handheld machine tool for the release of the at least one locking element.

Thus, the exemplary embodiments and/or exemplary methods of the present invention is intended to provide a self-locking locking system in which, in a simple way, one may do without the operation of the locking sleeve by the user, by using the at least one control element in pushing and locking the base body onto or at the fastening unit.

The at least one control element may be, at least by sections, a control ball engaging in an associated, radial opening of the base body.

Consequently, providing an uncomplicated and cost-effective control element is made possible.

The clamping ring of the locking sleeve may have at least one beveled region lying against the at least one control element, which is developed to effect the axial displacement of the locking sleeve in response to a force acting by the at least one control element based on a radial displacement of the at least one control element.

Thus, a certain and reliable control function is made possible by the at least one control element.

The at least one control element may be developed to carry out the radial displacement in response to pushing the base body onto the fastening unit of the handheld machine tool by a rolling motion along a beveled running surface assigned to the fastening unit.

Thus, a radial displacement of the at least one control element is made possible in a simple manner.

According to one specific embodiment, the detachable rotationally locked fastening of the base body to the fastening unit of the handheld machine tool is detachable by an axial displacement of the locking sleeve into a direction facing away from the handheld machine tool against the spring force of the spring element.

Consequently, an additional shortening of the overall length of the tool attachment is made possible.

According to one specific embodiment, a drive unit connected to the base body is provided, which has an eccentric drive for driving the output shaft.

Thus, the exemplary embodiments and/or exemplary methods of the present invention is intended to provide in a simple manner the development of the tool attachment according to a type of eccentric attachment, so as to make possible its use in a plurality of different fields of application.

The object named at the outset may also be attained by an handheld machine tool having a tool holding fixture and a housing on which a tool attachment is able to be fastened having an output shaft and a base body. The base body forms an inner cavity and has an outer circumference on which an axially displaceable locking sleeve is situated for the release of at least one associated locking element against a spring force of a spring element, which has a clamping ring. On the housing, a fastening unit is provided, for the rotationally locked fastening to a anti-rotation locking unit developed on the inner cavity of the base body. The fastening unit and the unit protecting against torsion have complementary geometric forms, which are developed to engage with each other to form a detachable rotationally locked fastening of the base body on the fastening unit. The at least one associated locking element is situated in the vicinity of the unit of protection from torsion.

In addition, the object named at the outset is also attained by a tool system having an handheld machine tool and a tool attachment. The handheld machine tool has a tool holding fixture and a housing, on which a base body of the tool attachment equipped with an output shaft is able to be fastened. The base body forms an inner cavity and has an outer circumference on which an axially displaceable locking sleeve is situated for the release of at least one associated locking element against a spring force of a spring element, which has a clamping ring. On the housing there is provided a fastening unit for the rotationally locked fastening to a anti-rotation locking unit, developed in an inner cavity of the base body, the fastening unit and the anti-rotation locking unit demonstrating complementary geometric forms which are developed to engage with each other for the detachable rotationally locked fastening of the base body on the fastening unit. The at least one associated locking element is situated in the vicinity of the anti-rotation locking unit.

The present invention are explained in greater detail in the following description on the basis of exemplary embodiments illustrated in the drawings.

DETAILED DESCRIPTION

Figure 1:
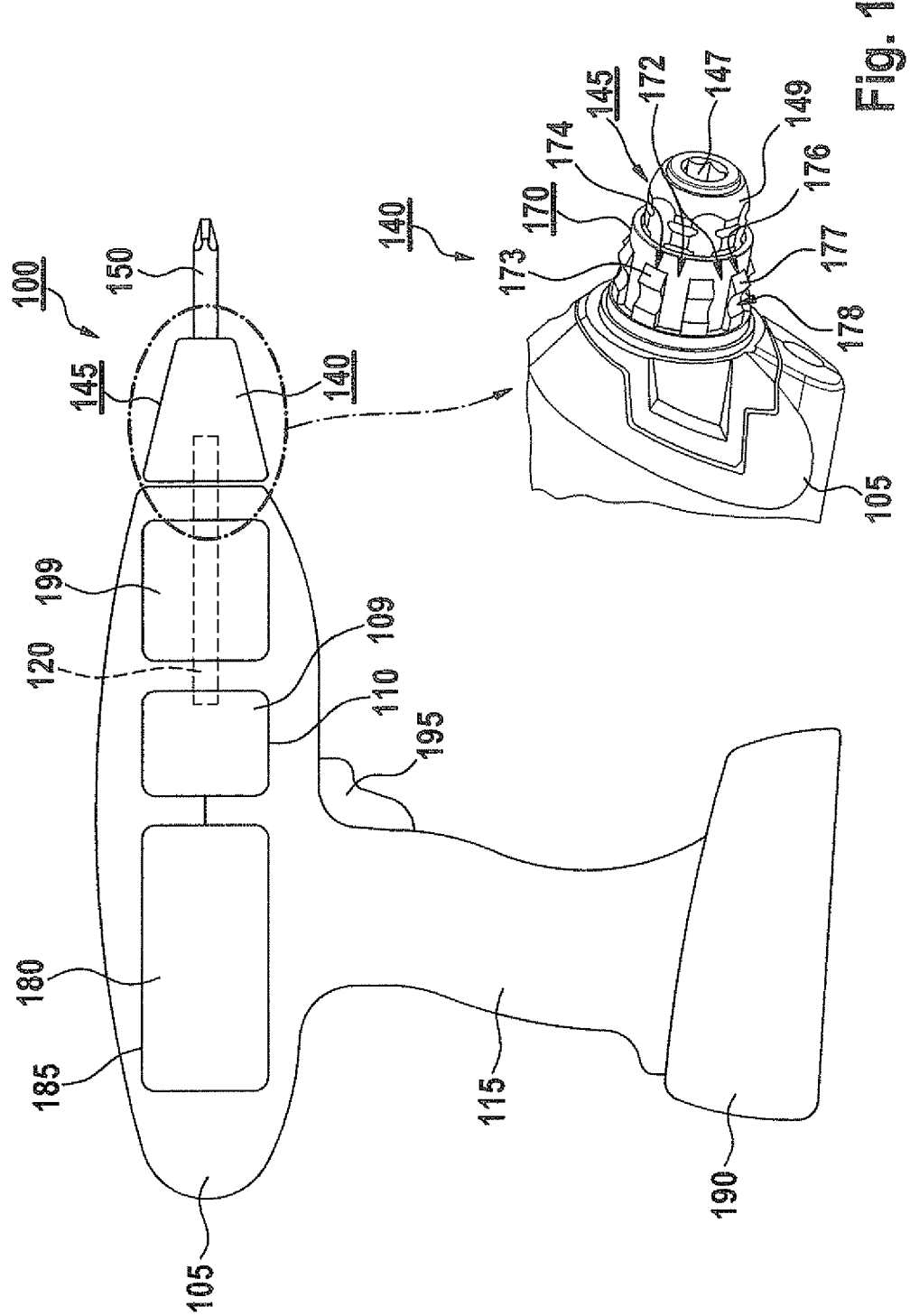
FIG. 1 shows a schematic view of an handheld machine tool having a tool holding fixture and a fastening unit according to one specific embodiment.

FIG. 1 shows an exemplary handheld machine tool 100, which has a tool housing 105 having a handle 115. According to one specific embodiment, handheld machine tool 100 is able to be connected mechanically and electrically to a battery pack 190 for a power supply that is network independent. In FIG. 1, handheld machine tool 100 is developed as a cordless drill/driver. It should be pointed out, however, that the present invention is not limited to cordless drill/drivers, but may be applied to different handheld machine tools, in which a tool is put into rotation, independently of whether the handheld machine tool is operable by battery pack 190 network-dependently or independently, for instance, in the case of a screwdriver or cordless screwdriver, an impact screwdriver or a cordless impact screwdriver, an impact drilling machine or a cordless impact drilling machine, etc.

In tool housing 105, there are situated an electric drive motor 180 supplied with current by battery pack 190 and a transmission 109. Drive motor 180 is connected via transmission 109 to a drive shaft 120, such as a drive spindle. In the operation of handheld machine tool 100, motor 180 drives drive shaft 120 rotatingly via transmission 109.

Drive motor 180 is illustratively situated in a motor housing 185 and transmission 109 in a transmission housing 110, transmission housing 110 and motor housing 185 being situated exemplarily in tool housing 105. Transmission 109 has a tool holding fixture 140 assigned to it for accommodating a tool 150 which, for example, has a bit holder 145. This tool holding fixture 140 may be integrally formed to drive shaft 120 that is drivable via transmission 109, or it may be connected to it in an attached form Bitholder 145 illustratively has an operating sleeve 149 and a hexagonal internal receptacle for accommodating a so-called HEX drill or a screwdriver bit. Suitable HEX drills and screwdriver bits are tools that have a hexagonal cross section, at least section-wise, which in HEX drills is provided with an annular groove. In addition, bit holder 145 may also, or alternatively, be developed for accommodating a so-called SDS Quick Mini drilling tool. SDS Quick Mini drilling tools are drilling tools which have an essentially cylindrical shaft having two protruding, rotation-catching crosspieces parallel to the longitudinal axis of the shaft, which each have a locking recess. Such tools, as well as the configuration and the functional manner of a suitable bit holder are sufficiently well known to one skilled in the art, for instance, from German document DE 20 2007 010 699 U1, whose disclosure is explicitly included in the present description, so that, at this place, a detailed description of these components may be omitted for the purpose of conciseness in the description.

Drive motor 180, for example, is able to be switched on and off via a manual switch 195 and may be of any desired type, for example, an electronically commutated motor or a DC motor. Drive motor 180 may be controllable or regulatable in such a way that both a reverse operation and specifications in regard to a desired rotational speed are able to be implemented. The method of functioning and the configuration of a suitable drive motor are sufficiently known from the related art so that, at this place, a detailed description may be omitted for the purpose of conciseness in the description.

Transmission 109 may be developed, for instance, like a reduction gearing which is implementable, for example, using a planetary gear developed to have different planetary stages, to which a torque coupling 199 is optionally assigned. Torque coupling 199 is developed to prevent the driving of drive shaft 120 by transmission 109 during operation of handheld machine tool 100, in case a torque transmitted to transmission 109 by drive shaft 120 exceeds a threshold value that is able to be set by a user of handheld machine tool 100. In addition, handheld machine tool 100 may have further components, such as a mechanical or pneumatic striking mechanism, etc. It should be pointed out, however, that an embodiment of a suitable transmission having an associated torque coupling as well as mechanical and pneumatic striking mechanisms and their method of functioning are sufficiently known to one skilled in the art so that at this place, a detailed description may be omitted for the purpose of conciseness in the description and simplicity of the drawings.

According to one specific embodiment, handheld machine tool 100 or rather tool holding fixture 140 has associated with it a fastening unit 170, which is illustratively fastened to tool housing 105 in an axially and radially immovable manner. This is developed sleeve-shaped, for example, and is therefore subsequently also designated as "fastening sleeve". We should point out, however, that fastening sleeve 170 is only developed in exemplary fashion as a separate component, and, alternatively to this, is also able to be developed as in one piece with tool housing 105.

Fastening sleeve 170 is used as a locking and centering device for an associated tool attachment (200 in FIG. 2), and surrounds, at least in sections, bit holder 145 at a specified radial distance, in order to make possible an axial displacement of operating sleeve 149 of bit holder 145 on the inside of fastening sleeve 170. At the outer circumference of fastening sleeve 170, crosspiece-like elevations are provided, that are illustratively at a distance from one another, which extend in the longitudinal direction of fastening sleeve 170, and of which only two elevations are labeled by reference numerals 174, 176, for the purpose of functional clarity and clarity of the drawings. Between these crosspiece-like elevations, groove-like recesses are illustratively developed of which, for the purpose of functional clarity and clarity of the drawings, only two recesses are labeled by reference numeral 172. These recesses 172 may be developed, for instance, as gaps between the crosspiece-like elevations or in the manner of depressions on the outer circumference of fastening sleeve 170.

According to one specific embodiment, for example, approximately centrically in the longitudinal direction of the crosspiece-like elevations, an annular groove 178 is developed that is interrupted by the groove-like recesses. In addition, at the crosspiece-like elevations, for instance, starting from annular groove 178, beveled running surfaces are developed, as seen in the direction of bit holder 145. The crosspiece-like elevations 174, 176, for example, have beveled running surfaces 173 and 177.

Figure 2:
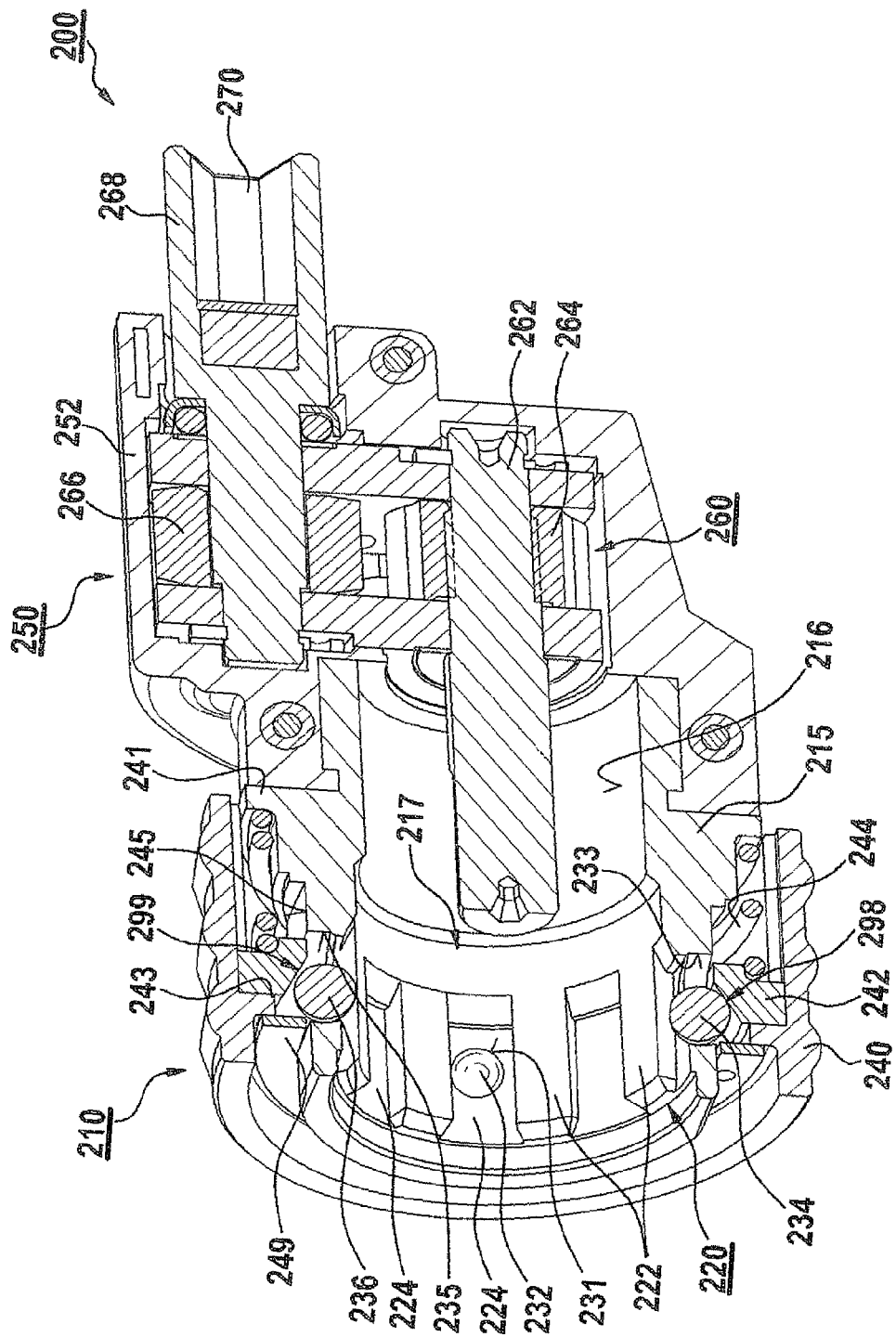
FIG. 2 shows a sectional view of a tool attachment according to one specific embodiment.

FIG. 2 shows an exemplary tool attachment 200 which, according to one specific embodiment, is developed for fastening to fastening sleeve 170 of handheld machine tool 100 of FIG. 1. Tool attachment 200 is developed illustratively in a manner of an eccentric attachment and has, in an exemplary manner, a locking section 210 provided for locking and centering, as well as a drive unit 250 that is designated below also as an "eccentric drive section".

Locking section 210 illustratively has a base body 215, which develops an inner cavity 216 equipped with a anti-rotation locking unit 220 and at whose outer circumference 245 an axially displaceable locking sleeve 240 is situated. Anti-rotation locking unit 220 is developed for the rotationally locked fastening of base body 215 on fastening unit 170 of handheld machine tool 100 of FIG. 1. Locking sleeve 240 is used, as described below for FIG. 3, for releasing or blocking of at least one associated locking element 232, which is developed illustratively as a type of locking ball. At least two locking balls may be used at different circumferential positions of base body 215.

According to one specific embodiment, anti-rotation locking unit 220 is developed in an axial end region 217 of base body 215 or of inner cavity 216, that faces away from eccentric drive section 250, in such a way that anti-rotation locking unit 220 and fastening unit 170 of handheld machine tool 100 of FIG. 1 have complementary geometric shapes that are suitable for developing a form-locking connection, and for this are developed to engage in one another to form a detachable rotationally locked fastening of base body 215 on fastening unit 170. Accordingly, anti-rotation locking unit 220 has illustratively on the inner circumference of cavity 216 or base body 215, developed crosspiece-like elevations, at a distance from one another, which extend in the longitudinal direction of cavity 216, and of which only two elevations are labeled by reference numeral 222, for the purpose of functional clarity and clarity of the drawings. Between these crosspiece-like elevations, groove-like recesses are illustratively developed of which, for the purpose of functional clarity and clarity of the drawings, only two recesses are labeled by reference numeral 224. These recesses 224 may be developed, for instance, as gaps between the crosspiece-like elevations or in the manner of depressions on the inner circumference of cavity 216 or of base body 215.

According to one specific embodiment, in the region of anti-rotation locking unit 220, that is, in axial end region 217 of cavity 216, the at least one locking ball 232 is situated in an assigned radial opening 231 provided on base body 215. In addition, on base body 215, at least one and, in exemplary fashion, two control elements 234, 236 are provided, which are developed as control balls, for example. These are illustratively situated in associated radial openings 233 and 235 of base body 215, and are developed, in response to pushing base body 215 onto fastening unit 170 of handheld machine tool 100 of FIG. 1, for the release of locking ball 232, to effect an axial displacement of locking sleeve 240 on the outer circumference of base body 215, as will be described below, for FIG. 3.

Locking sleeve 240 is acted upon, on the outer circumference 245 of base body 215, by a spring element 244, such as a pressure spring, in a direction facing away from eccentric drive section 250 (398 in FIG. 3) to put it into a locking position. For this, pressure spring 244 is situated, for example, between a collar-shaped annular shoulder 241, developed at the outer circumference of base body 215 in the area of eccentric drive section 250, and a clamping ring 242 provided at the inner circumference of locking sleeve 240, which is supported on an inner annular shoulder 243 of locking sleeve 240, and, at least in the area of control balls 234, 236, has beveled regions 298 and 299 facing them. We should point out, however, that locking sleeve 240 and clamping ring 242 are developed as two pieces only in exemplary fashion, and, alternatively to this, may also be developed as one piece or several pieces. In order to prevent the sliding off of locking sleeve 240 from outer circumference 245 of base body 215, their inner annular shoulder 243 and clamping ring 242 are blocked in the locking position, which represents an axial end position of locking sleeve 240 in the direction facing away from eccentric drive section 250 (398 in FIG. 3), by a securing ring 249.

According to one specific embodiment, eccentric drive section 250 has an eccentric transmission 260, having an output shaft 268 that is equipped, for example, with a hexagonal inner receptacle 270, for driving a tool, such as tool 150 of FIG. 1. The drive shaft is illustratively supported rotatingly, e.g. at least axially immovably on housing section 252 that is fastened to base body 215, and is rotatable by an output wheel 266, which is able to be driven by a drive wheel 264 coupled to a drive shaft 262. Drive shaft 262, as seen in the axial direction, is supported, at least at one end, rotatably on housing section 252 and may be able to be connected at least to one inner receptacle of a bit holder, such as hexagonal inner receptacle 147 of bit holder 145 of FIG. 1, as is described below for FIG. 3.

It should be pointed out, however, that suitable eccentric drive sections and eccentric transmissions are sufficiently well known to one skilled in the art. For this reason, for the sake of conciseness in the description, we make do without a detailed description of this component.

Figure 3:
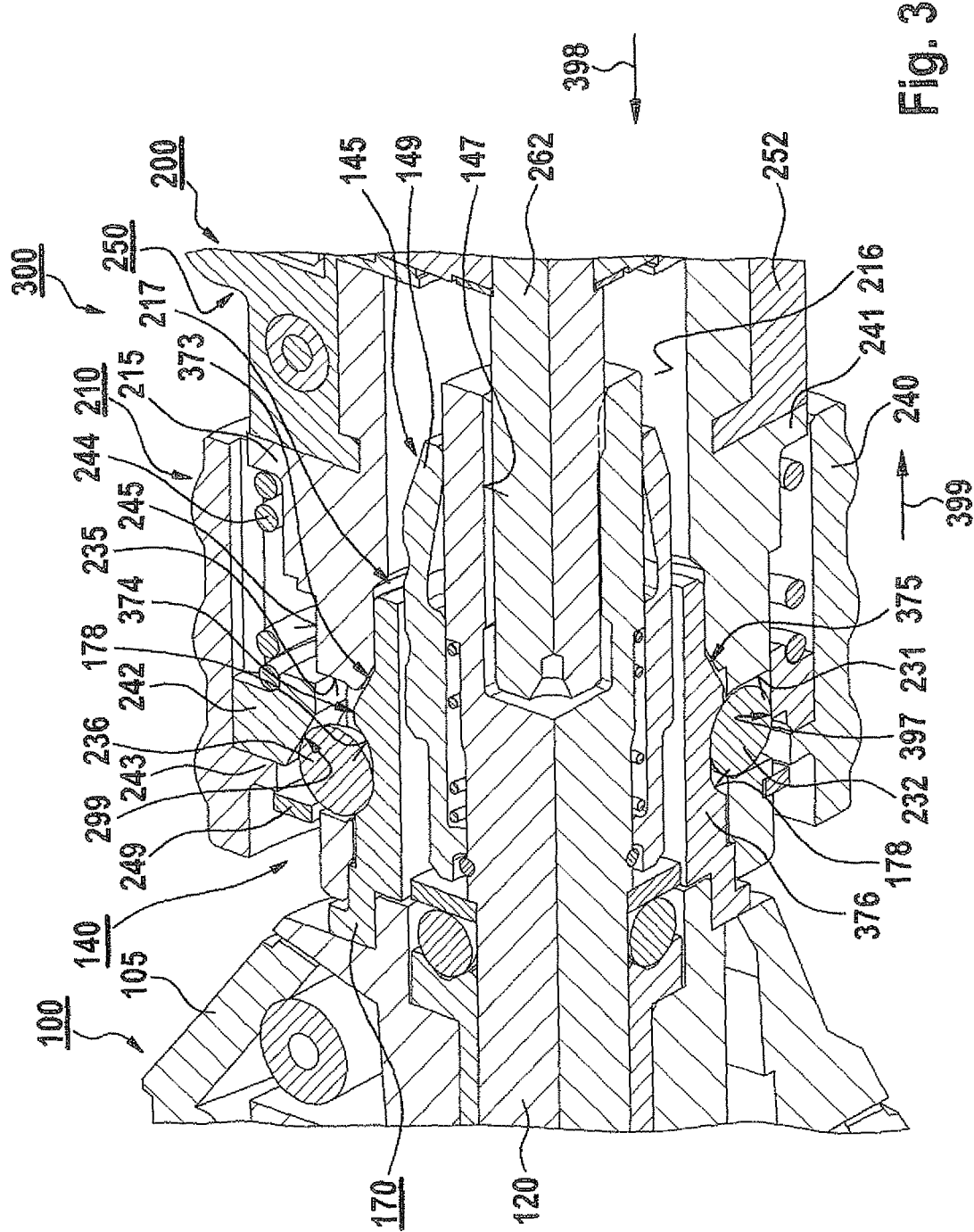
FIG. 3 shows a sectional view of a cutout of a tool system using the handheld machine tool of FIG. 1 and the tool attachment fastened to it of FIG. 2.

FIG. 3 shows a tool system 300 having the handheld machine tool 100 of FIG. 1 and tool attachment 200 of FIG. 2 for clarifying a locking of tool attachment 200 on fastening sleeve 170 of handheld machine tool 100. For the sake of simplification of the representation, tool attachment 200 and handheld machine tool 100, in this instance, illustrated only in sections with the aid of a sectional view, which includes a sectional range of approximately 90°.

To fasten tool attachment 200 on fastening unit 170 of handheld machine tool 100, the latter's base body 215 is pushed onto fastening sleeve 170, in the direction of an arrow 398. In this context, first, axial end region 217 of cavity 216 is positioned over fastening sleeve 170 and centered, and the axial end of drive shaft 262, facing inner receptacle 147 of bit holder 145 of FIG. 1, is guided into it. By an additional displacement of tool attachment 200 in the direction of arrow 398, the crosspiece-like elevations (222 of FIG. 2) of anti-rotation locking unit (220 of FIG. 2) achieve engagement with the associated, groove-like recesses (172 in FIG. 1) of fastening unit (170) and the crosspiece-like elevations (174, 176 of FIG. 1) of fastening unit 170, of which two, that are characterized in FIG. 3, for instance, by 374 and 376, achieve engagement with the associated, groove-like recesses (224 in FIG. 2) of the anti-rotation locking unit (220 of FIG. 2). In this context, control ball 236 comes illustratively into contact with a beveled running surface 373 of crosspiece-like elevation 374, and locking ball 232 comes into contact with a beveled running surface 375 of crosspiece-like elevation 376. Analogously to this, control ball 234 of FIG. 2 would come into contact, for example, with running surface 173, 177 of crosspiece-like elevation 174 and 176 of FIG. 1.

In response to a further displacement of tool attachment 200 in the direction of arrow 398, a rolling off of control ball 236 along beveled running surface 373 is then forced, whereby a radial displacement is effected in the direction of locking sleeve 240 and beveled area 299 of clamping ring 242. In this connection, a force effect is produced by control ball 236 on clamping ring 242, which leads to an axial displacement of locking sleeve 240 in a direction 399 facing away from handheld machine tool 100, against the spring force of pressure spring 244. By this axial displacement, a release of locking ball 232 takes place, which, by rolling off along an associated beveled running surface 375 of crosspiece-like elevation 376, is also radially displaced outwards.

The radially outward displacement of control ball 236 and of locking ball 232 ends when, because of the displacement of tool attachment 200 in the direction of arrow 398 via beveled running surfaces 373 and 375, respectively, they reach the region of annular groove 178, developed on fastening unit 170. There, control ball 236 and locking ball 232 are displaced, by clamping ring 242 provided on locking sleeve 240, radially inwards into annular groove 178. This takes place by an axial displacement of locking sleeve 240 in the direction of arrow 398 because of the spring force of pressure spring 244, which acts upon locking sleeve 240, as described above, to put it into its locking position. In this connection, locking ball 232 is illustratively blocked by a flat, non-beveled region 397 of clamping ring 242 in annular groove 178, and is consequently able to be released again only by a manual displacement of locking sleeve 240 in the direction of arrow 399, that is, in a direction facing away from handheld machine tool 100, counter to the spring force of pressure spring 244.

Base body 215 and consequently tool attachment 200 are accordingly locked in a detachable manner on fastening unit 170 of handheld machine tool 100, without a manual displacement of locking sleeve 240 by a user being required. Thus, the mounting of tool attachment 200 on handheld machine tool 100 may take place in a convenient manner single-handedly by the user. In this connection, base body 215 is fixed and centered in rotationally locked fashion on the fastening unit for torque support, using the anti-rotation locking unit (220 of FIG. 2).

According to one specific embodiment, the detachable rotationally locked fastening of base body 215 to fastening unit 170 is detachable by an axial displacement of locking sleeve 240 in a direction facing away from handheld machine tool 100, i.e. direction 399, against the spring force of spring element 244. Control ball 236 and locking ball 232 are released by such an axial displacement of locking sleeve 240, and consequently are able to be radially displaced outwards for, and during pulling off tool attachment 200 from fastening unit 170 in the direction of arrow 399.

What is claimed is:

1. A tool attachment for fastening to a handheld machine tool equipped with a tool holding fixture, comprising:
a tool attachment arrangement, including:
an output shaft and a base body which forms an inner cavity and at whose outer circumference an axially displaceable locking sleeve is situated for releasing at least one associated locking element against a spring force of a spring element, which has a clamping ring;
wherein, in the inner cavity, an anti-rotation locking unit is configured for the rotationally locked fastening of the base body to a fastening unit associated with the handheld machine tool, the anti-rotation locking unit and the fastening unit having complementary geometric forms configured to engage with one another for the detachable rotationally locked fastening of the base body to the fastening unit, and wherein the at least one associated locking element is situated in the vicinity of the anti-rotation locking unit,
wherein at least one control element is configured to effect an axial displacement of the locking sleeve in a direction facing away from the handheld machine tool, against the spring force of the spring element, when the base body is pushed onto the fastening unit of the handheld machine tool for releasing the at least one locking element.

2. The tool attachment of claim 1, wherein the anti-rotation locking unit and the fastening unit are provided for providing a form-locking connection.

3. The tool attachment of claim 1, wherein the anti-rotation locking unit has at least one groove-like recess for accommodating a crosspiece-like elevation associated with the fastening unit.

4. The too attachment of claim 1, wherein the anti-rotation locking unit has at least one crosspiece-like elevation for engaging with a groove-like recess associated with the fastening unit.

5. The tool attachment of claim 1, wherein the at least one control element, at least in sections, is a control ball engaging with an associated radial opening of the base body.

6. The tool attachment of claim 1, wherein the clamping ring of the locking sleeve has at least one beveled region lying against the at least one control element, which is configured to effect the axial displacement of the locking sleeve in response to a force acting by the at least one control element based on a radial displacement of the at least one control element.

7. The tool attachment of claim 1, wherein the at least one control element is configured to carry out the radial displacement when the base body is pushed onto the fastening unit of the handheld machine tool by a rolling off along a beveled running surface that is associated with the fastening unit.

8. The tool attachment of claim 1, wherein the detachable rotationally locked fastening of the base body to the fastening unit of the handheld machine tool is detachable by an axial displacement of the locking sleeve in a direction facing away from the handheld machine tool against the spring force of the spring element.

9. The tool attachment of claim 1, wherein a drive unit is connected to the base body and has an eccentric transmission for driving the output shaft.

10. An handheld machine tool, comprising:

a tool holding fixture and a housing, on which a tool attachment is fastenable to an output shaft and a base body, the base body forming an inner cavity and having an outer circumference on which an axially displaceable locking sleeve is situated for releasing at least one associated locking element against a spring force of a spring element, which locking sleeve has a damping ring;

wherein, on the housing, a fastening unit is provided for the rotationally locked fastening to a anti-rotation locking unit configured in the inner cavity of the base body, the fastening unit and the anti-rotation locking unit having complementary geometric forms configured to engage with one another to form a detachable rotationally locked fastening of the base body to the fastening unit, and wherein the at least one associated locking element is situated in the vicinity of the anti-rotation locking unit, wherein at least one control element is configured to effect an axial displacement of the locking sleeve in a direction facing away from the handheld machine took, against the spring force of the spring element, when the base body is pushed onto the fastening unit of the handheld machine tool for releasing the at least one locking element.

11. A tool system, comprising:
a handheld machine tool; and
a tool attachment;

wherein the handheld machine tool includes a tool holding fixture and a housing, on which a base body of the tool attachment provided with an output shaft is fastenable, and wherein the base body provides an inner cavity and has an outer circumference, on which an axially displaceable locking sleeve is situated for releasing at least one associated locking element against a spring force of a spring element, which has a clamping ring, wherein, on the housing, a fastening unit is provided for the rotationally locked fastening to a anti-rotation locking unit configured in an inner cavity of the base body, the fastening unit and the anti-rotation locking unit having complementary geometric forms configured to engage with one another for the detachable rotationally locked fastening of the base body to the fastening unit, and wherein the at least one associated locking element is situated in the vicinity of the anti-rotation locking unit, wherein at least one control element is configured to effect an axial displacement of the locking sleeve in a direction facing away from the handheld machine tool, against the spring force of the spring element, when the base body is pushed onto the fastening unit of the handheld machine tool for releasing the at least one locking element.

\* \* \* \* \*